United States Patent [19]
Yoshimura et al.

[11] Patent Number: 4,796,185
[45] Date of Patent: Jan. 3, 1989

[54] TYPEWRITER HAVING ELECTRONIC DICTIONARY WITH EFFICIENT STORAGE, FOR PRINTING ANY STORED INFORMATION ASSOCIATED WITH A ENTERED WORD OR ENTERED WORD

[76] Inventors: Motokazu Yoshimura; Koichi Hirata, both of c/o Brother Kogyo Kabushiki Kaisha, 35, 9-chome, Horita-dori, Mizuho-ku, Nagoya-shi, Aichi-ken; Kimie Kurebayashi, 6-9, Nijigahama, Hiratsuka-shi, Kanagawa-ken, all of Japan

[21] Appl. No.: 943,834

[22] Filed: Dec. 18, 1986

Related U.S. Application Data

[63] Continuation of Ser. No. 628,779, Jul. 9, 1984.

[30] Foreign Application Priority Data

Jul. 8, 1983 [JP] Japan ................................. 58-125139

[51] Int. Cl.⁴ ..................... G06F 15/38; G06F 7/16; G06F 7/07
[52] U.S. Cl. .................................... 364/419; 364/200; 364/900
[58] Field of Search ............... 364/419, 200 MS File, 364/900 MS File

[56] References Cited

U.S. PATENT DOCUMENTS

| | | | |
|---|---|---|---|
| 4,159,536 | 6/1979 | Kehoe | 364/900 |
| 4,367,537 | 1/1983 | Yoshida | 364/900 |
| 4,381,551 | 4/1983 | Kanou et al. | 364/900 |
| 4,384,329 | 5/1983 | Rosenbaum | 364/300 |
| 4,420,817 | 12/1983 | Yoshida | 364/900 |
| 4,438,505 | 3/1984 | Yanagiuchi et al. | 364/900 |
| 4,468,754 | 8/1984 | Asada et al. | 364/419 X |
| 4,507,750 | 3/1985 | Frantz et al. | 364/900 |
| 4,541,069 | 9/1985 | Kanou et al. | 364/419 X |
| 4,543,631 | 9/1985 | Kurosu et al. | 364/419 X |
| 4,586,160 | 4/1986 | Amano et al. | 364/419 |
| 4,590,560 | 5/1986 | Sado | 364/900 |

Primary Examiner—Charles E. Atkinson
Assistant Examiner—Gail O. Hayes

[57] ABSTRACT

An electronic dictionary comprising a dictionary memory having multiple data memory locations identified by respective addresses. Each of the data memory locations comprising a word-data memory location which stores word data representative of a word of a language. The word data in each one of the data memory locations comprising at least one character code each representing one of letters of the word, and/or at least one special code each representing a combination of at least two adjacent ones of said letters of the word which are idential with corresponding adjacent letters of the word represented by the word data in another of the data memory locations which is adjacent to the above each one data memory location. The dictionary further comprises a control unit which retrieves the word data corresponding to a keyed-in word and converts the special code, if any in the retrieved word data, into plural character codes which represent the letters represented by the special code.

7 Claims, 4 Drawing Sheets

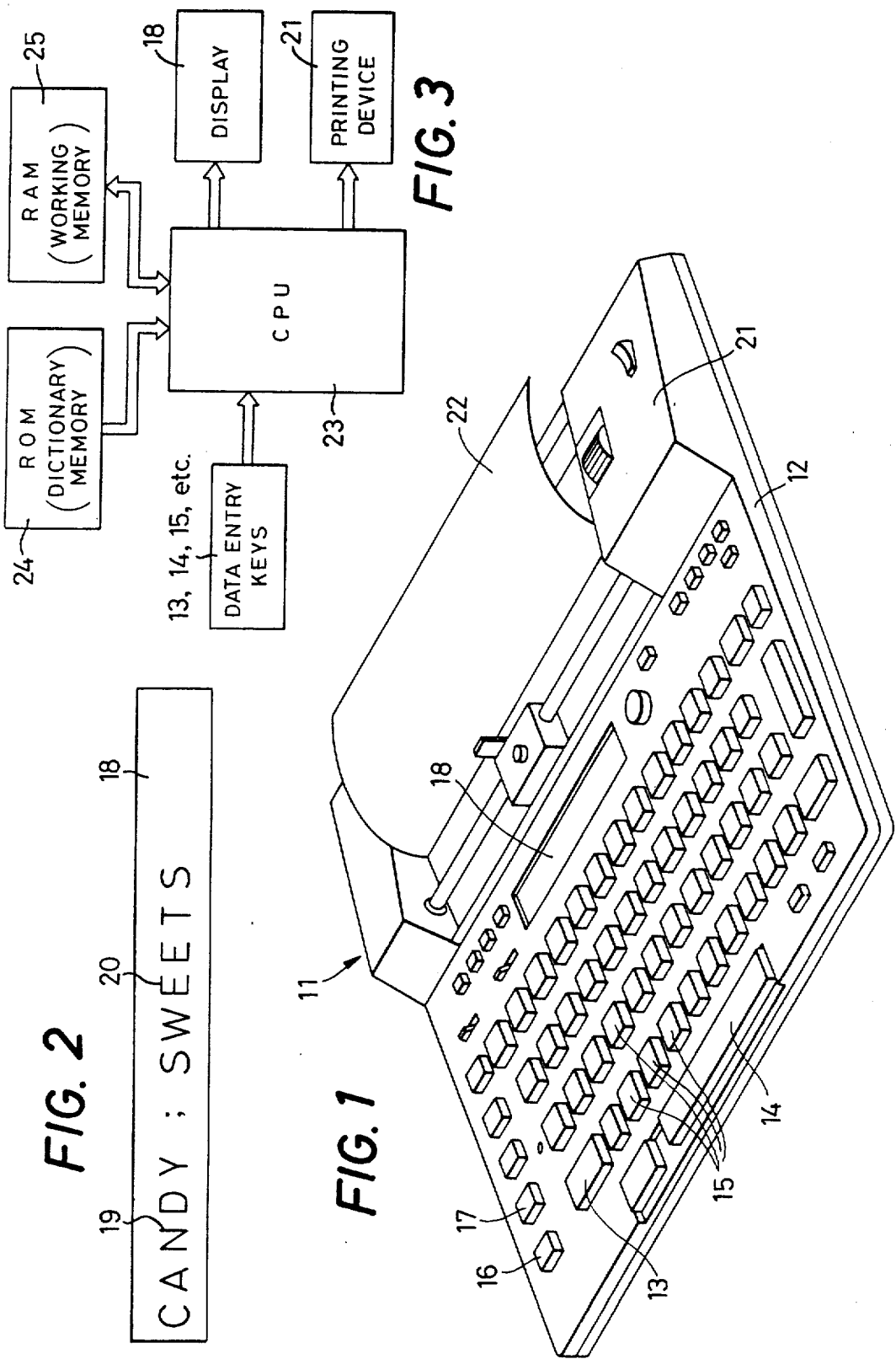

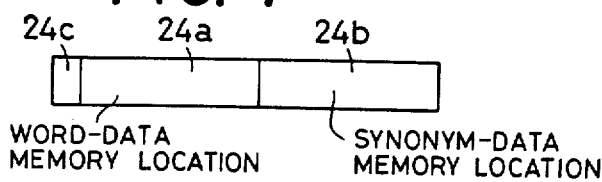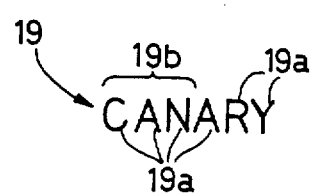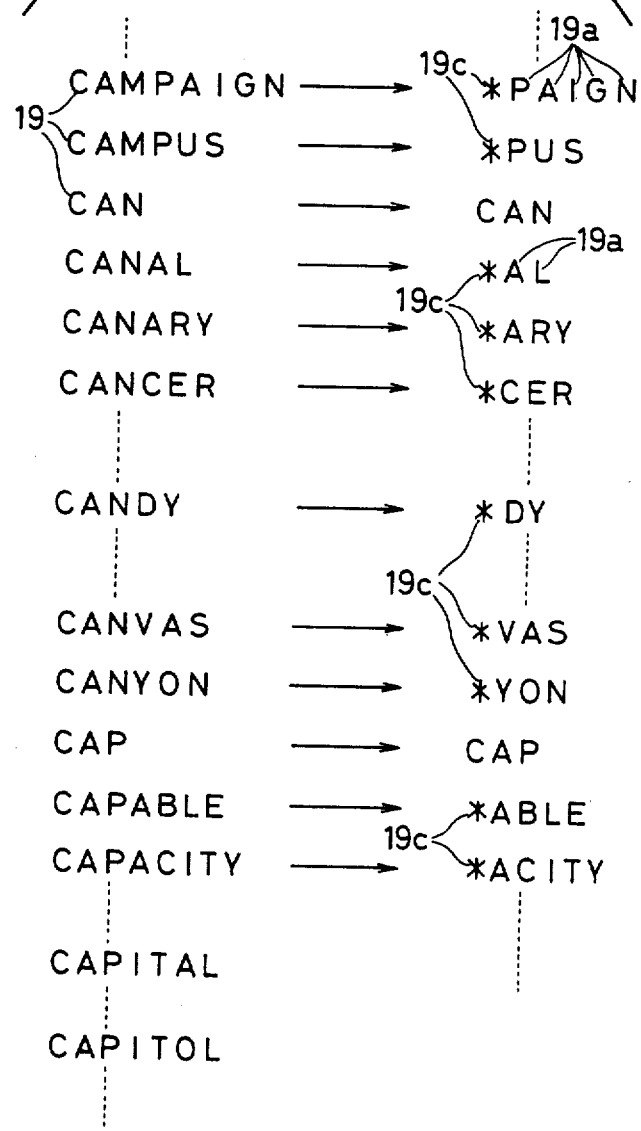

TYPEWRITER HAVING ELECTRONIC DICTIONARY WITH EFFICIENT STORAGE, FOR PRINTING ANY STORED INFORMATION ASSOCIATED WITH A ENTERED WORD OR ENTERED WORD

This application is a continuation, of application Ser. No. 628,779, filed July 9, 1984.

BACKGROUND OF THE INVENTION

The present invention relates to a typewriter having an electronic dictionary device which is capable of displaying information associated with a word which is entered through suitable input means such as keys corresponding to letters used in a language. The information to be displayed includes one or more words which are synonymous with or antonymous to, or express in the same or another language the meaning of, the entered word.

An electronic dictionary is known, which uses a dictionary memory. Such a dictionary memory stores vocabulary data which consists of multiple blocks of word data representative of words of a language, e.g., English words. The vocabulary data are stored in a vocabulary storage section which comprises multiple word-data memory locations at which the respective word data are stored. Corresponding to the word-data memory locations, there are provided multiple related-data memory locations which constitute a related-data storage section. In each of the related-data memory locations, there is stored related data which represents information associated with the word stored in the corresponding word-data memory location. The associated information includes one or more synonyms or antonyms of the corresponding word, and/or a word or words which express in the same (e.g., English) or another language (e.g., Japanese) the meaning of the corresponding word. The word data are stored in the data memory locations from the first to the last addresses, so that the words represented by the respective word data are arranged in a predetermined order of presentation of letters used in the language. For example, English words are arranged in the alphabetical order as well known in the art of ordinary English dictionaries consisting of printed sheets of paper. Each block of word data is stored in the form of plural character codes which represent the respective letters of each word represented by the word data.

In such a known electronic dictionary, the required memory capacity of the vocabulary storage section of its dictionary memory is affected by the number of entry words to be listed in the dictionary, and by the number of letters of each word. Accordingly, the dictionary memory is required to have a larger memory capacity when the dictionary is required to contain a larger number of words. In other words, when the dictionary memory is relatively limited in memory capacity, the number of words that can be contained in the dictionary is accordingly limited.

SUMMARY OF THE INVENTION

It is accordingly an object of the present invention to provide an electronic dictionary which contains a relatively large number of entry words the word data of which are stored in a dictionary memory of a relatively small memory capacity.

According to the invention, there is provided an electronic dictionary comprising: (a) a dictionary memory having a multiplicity of data memory locations identified by respective addresses, each of the data memory locations comprising a word-data memory location which stores word data representative of a word of a language, the word data in the word-data memory location at each one of said addresses comprising at least one character code each representing a letters of said word, by themselves or together with at least one special code each representing a combination of at least two adjacent ones of said letters of the word which are identical with corresponding adjacent letters of the word represented by the word data in the word-data memory location at another of said addresses which is adjacent to the one address; (b) retrieval means for retrieving said character special codes stored in a word-data memory location; and (c) means for converting the retrieved special code into plural character codes which represent the respective combination of adjacent letters.

In the electronic dictionary constructed as described above, word data in a word-data memory location comprises a special code if at least two consecutive letters of a word represented by the word data are identical with corresponding consecutive letters of a word represented by the word data which is to be stored in the immediately preceding or following word-data memory location. The remaining letters of the word which are not identical to the corresponding letters of the preceding or following work are represented by ordinary character codes, respectively. When the word data is retrieved, the special code, if contained in the word data in combination with a character code or codes, is converted into character codes. Consequently, the word data can be utilized in the same manner as used in the case where the word data consists of only character codes. The use of the special code in place of plural character codes to represent plural letters reduces the required memory capacity of the dictionary memory, particularly of its vocabulary storage section, and makes it possible to store a relatively large number of entry words in the dictionary without increasing the storage capacity of its dictionary memory.

In the electronic dictionary of the invention stated above, the dictionary memory does not necessarily include related-data memory locations for storing related-data which represent words such as synonyms associated with the entry words represented by the word data stored in the word-data memory locations. Without these related-data memory locations, the dictionary of the invention may serve, for example, to check spellings of words entered through a keyboard of a typewriter if the dictionary of the invention is used in conjunction with the typewriter. In this case, the data keyed in through the keyboard is checked against the word-data stored in the word-data memory locations, to see if the keyed-in data represents any one of the words represented by the word data stored in the dictionary memory.

According to an advantageous embodiment of the invention, the word data is stored in the respective one of the word-data memory locations such that first letters of the individual words contained in the dictionary are arranged in a predetermined order of presentation of letters used in the language involved. When the first letters of the adjacent words are identical, second letters of the words are arranged in the predetermined order.

Third and following letters, if any, of the words are arranged in the above predetermined order when the second and following letters of the adjacent words are identical. The special code is used to represent plural consecutive letters of the word as counted from the first letter thereof when the plural consecutive letters are identical with corresponding letters of the adjacent word.

According to a preferred form of the above embodiment, a combination of letters of a first one of the consecutive words each of which has said combination of letters, are represented not by the special code, but by the character codes. These character codes in the first one of the consecutive word-data memory locations are utilized to indicate the special codes which are used in the following word-data memory locations.

According to another advantageous embodiment of the invention, the special code to be used is changed depending upon the number of letters represented by the special code. For example, one special code is used for representing two letters, and a different special code is used for representing three letters.

According to a further advantageous embodiment of the invention, each of the data memory locations further comprises a related-data memory location in which is stored related-data which represents information associated with the word in the corresponding word-data memory location. Such information may comprise at least one of a synonym, an antonym, and an equivalent word in another language, of the word in the corresponding word-data memory location.

In accordance with a preferred embodiment of the invention, the electronic dictionary further comprises a working memory, checking means, and an input device which includes a multiplicity of character keys operable to designate letters of the words of the language, and a call key operable to retrieve a desired one of the words from the dictionary memory. The working memory stores character data entered through the character keys, and the retrieval means retrieves, upon activation of the call key, said at least one character code and each said special code of the word data stored in one of the word-data memory locations which is determined in a predetermined manner. The checking means checks if the retrieved word data which consists of said at least one character code, and said plural character codes converted from each said special code by the converting means, is identical with the character code, or not.

According to an advantageous form of the above embodiment, each of the data memory locations further comprise a flag-data memory location for storing flag data indicative of one end of a range of search in which a search of the data memory locations is effected in response to the activation of the the call key to find the word data representing the keyed-in word.

According to the invention, there is also provided a typewriter which includes an electronic dictionary of the invention, and further includes a printing device, display means, a working memory and a keyboard. The keyboard has a multiplicity of character keys operable to designate letters of the words of said language, a call key operable to retrieve a desired one of the words from the dictionary memory, and a space bar. The working memory stores character data entered through the character keys. Each of the data memory locations further comprises a related-data memory location which stores related-data which represents information associated with the word in the corresponding word-data memory location. The associated information comprises at least one of a synonym, an antonym, and an equivalent word in another language, of the word in the corresponding word-data memory location. The printing device prints the associated information when the information is indicated on the display means upon activation of the space bar, or the word represented by the character data entered through the character keys when the associated information is not indicated on the display means upon activation of the space bar.

BRIEF DESCRIPTION OF THE DRAWING

The above and other objects, features and advantages of the present invention will be better understood from reading the following description of the preferred embodiment taken in conjunction with the accompanying drawing in which:

FIG. 1 is a perspective view of an electronically operated typewriter equipped with one embodiment of an electronic dictionary of the invention;

FIG. 2 is an illustration of a display provided on the typewriter of FIG. 1, showing an example of indication on the display;

FIG. 3 is a schematic block diagram of an electric control system of the typewriter;

FIG. 4 is a view showing storage sections of a dictionary memory used in the electronic dictionary;

FIG. 5 is a diagrammatic illustration showing some of data memory locations of the dictionary memory, and an example of contents of the dictionary memory, particularly the contents of word-data memory locations thereof;

FIGS. 6 and 7 are views for explaining the use of special codes in word data to be stored in the word-data memory locations.

DETAILED DESCRIPTION OF THE PREFERRED EMBODIMENTS

Figure 8:
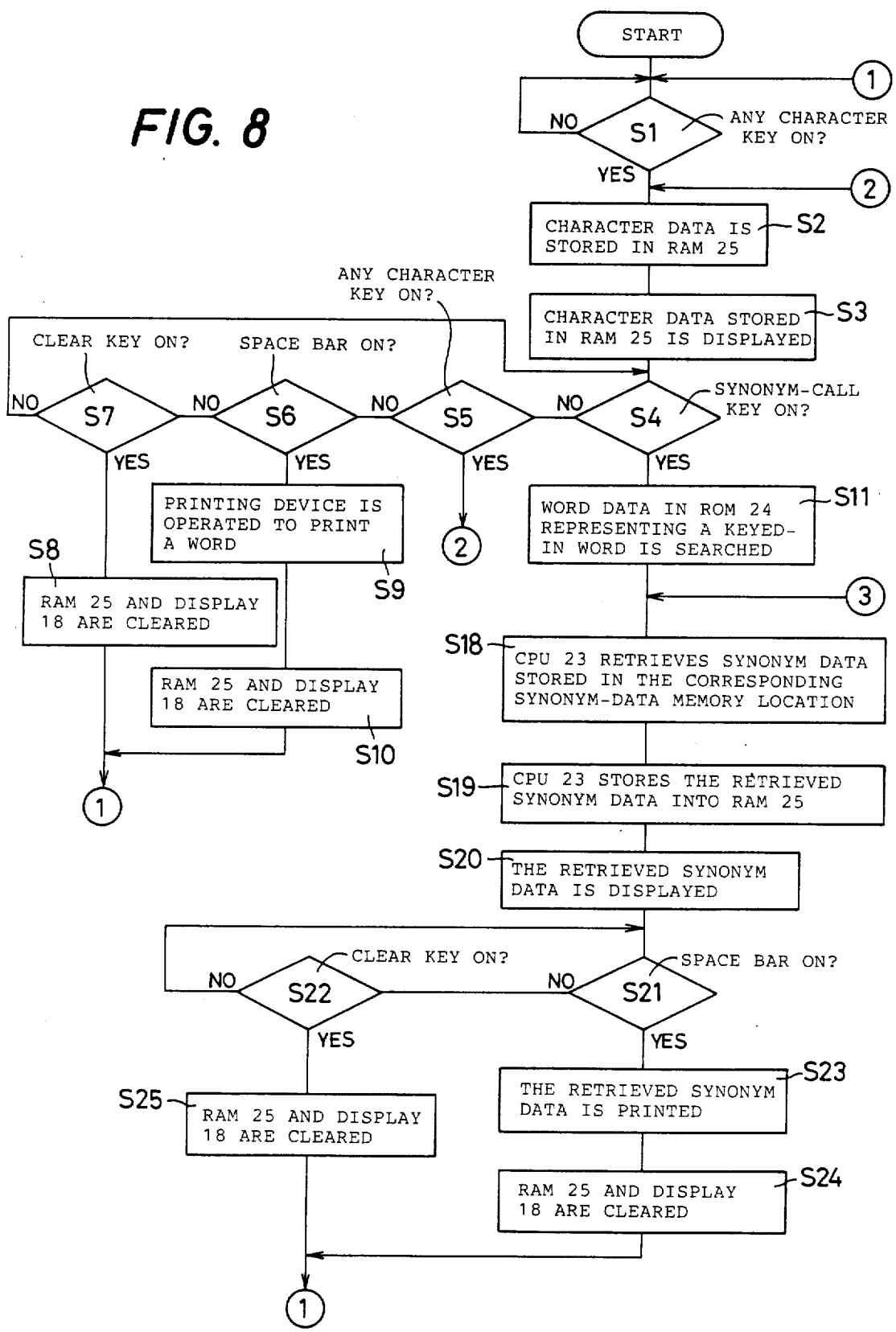
FIGS. 8 and 9 are diagrammatic flow charts showing events of operation controlled by a central processing unit of the control system.

Referring to the accompanying drawings, there is shown in FIG. 1 an electronic typewriter generally indicated at 11, which is equipped with an electronic dictionary of the invention. The typewriter 11, which is constructed also according to the invention, includes an input device in the form of a data input keyboard 12 which has a shift key 13, a space bar 14, and a multiplicity of character keys 15 corresponding to alphabetic letters, numerals and symbols. Desired data such as letters (English words) and digits (numerical values) are entered or keyed in through the character keys 15.

To the left of the shift key 13, there are disposed a synonym-call key 16 and a clear key 17. The synonym-call key 16 is operated when it is desired to find a word which is synonymous with or allied in meaning to the meaning of a word (e.g., English word) which is entered through the character keys 15. The clear key 17 is operated when it is desired to cancel an already keyed-in word and enter a new word, more precisely, to replace the already keyed-in characters (not necessarily a word) with a new set of characters (which usually form a word). In a rear central portion of the keyboard 12, is provided display means in the form of a display 18 which is adapted to indicate data keyed in through the character keys 15, for example a word 19 ("CANDY"), and also a synonym 20 ("SWEETS") of the keyed-in word 19 (shown in FIG. 2). Behind the keyboard 12, there is disposed a printing device 21 which is capable of effecting a printing operation on a sheet of paper 22, upon activation of the space bar 14, according to character data which have been entered through the character keys 15 prior to the activation of the space bar 14.

Referring next to FIGS. 3 through 7, there will be described an arrangement of an electric control system of the electronic dictionary incorporated in the typewriter 11 constructed as stated above.

The control system comprises a central processing unit 23 (hereinafter simply called "CPU 23") which includes retrieval, converting and checking means which will be understood from the following description. Upon activation of the space bar 14, character keys 15, synonym-call key 16 and other keys on the keyboard 12, the corresponding input signals are transferred to the CPU 23, which responds to these input signals to operate the printing device 21 and the display 18 for printing the keyed-in words on the sheet of paper 22, and indicating them on the display 18.

The CPU 23 is connected to a dictionary memory in the form of a read-only-memory ROM 24 (hereinafter referred to as "ROM 24"), and to a working memory in the form of a random-access-memory RAM 25 (hereinafter referred to as "RAM 25"). The ROM 24 comprises a multiplicity of data memory locations identified by respective numbered addresses as shown in FIG. 5. Each of the data memory locations consists of a word-data memory location 24a, a related-data memory location in the form of synonym-data memory location 24b, and a flag-data memory location 24c, as shown in FIG. 4. In the word-data memory location 24a, there is stored a set of word data which represents an English word 19. Thus, the word-data memory locations 24a of the multiple data memory locations constitute a vocabulary storage section in which multiple different English words are stored in the alphabetical order as illustrated in FIG. 5.

The word data stored in the word-data memory locations 24a at each one of the addresses is a set of coded data which consists of at least one character code, and if appropriate, at least one special code. Each character code represents one of letters 19a of the English word 19 represented by the word data. Each special code represents a combination of at least two adjacent ones of the letters 19a of the word 19 which are identical with corresponding adjacent letters 19a of the word 19 which is represented by the word data to be stored in the word-data memory location 24a at another address which is adjacent to the said each one address. Stated in more detail referring to FIGS. 5, 6 and 7, there are many words which begin with the same combination of letters, for example, a combination of three letters "C", "A" and "N", i.e., "CAN" which are the first three letters of the words. This group of words having the first three letters "CAN" starts with "CAN" and ends with "CANYON" as shown in FIG. 5. For convenience, these plural consecutive letters such as "CAN" which are commonly present in the adjacent words are hereinafter called "common letters 19b", as shown in FIG. 7. The blocks of word data corresponding to these group of words are stored in the word-data memory locations 24a at addresses Nos. 210 through 239. For the reason which will be apparent from the following description, the word data for the first word "CAN" of the group does not use a special code. However, the common letters "CAN" 19b of the following words of the group (from the second word "CANAL" to the last word "CANYON") are stored in the form of the special code. That is, the common letters "CAN" 19b are replaced by a special symbol 19c which, in this specific example, is an asterisk "*". Therefore, the words "CANAL", "CANARY", . . . "CANYON" are expressed as "*AL", "*ARY", . . . "*YON", respectively. In storing the corresponding word data in the word-data memory locations 24a, the asterisk "*" representing the common letters 19b is converted into the special code, and the remaining letters 19a are converted into the respective character codes. Therefore, the use of one special code (asterisk 19c) to represent the three common letters "CAN" 19b saves a memory area for two letters to be stored in each of the word-data memory locations 24a.

Similarly, any combination of three common letters 19b used in other words are also replaced by the special symbol "*" 19c, and stored in the form of the special code. For example, three common letters 19b "CAP" of the words "CAPABLE", "CAPACITY", "CAPITAL", "CAPITOL", etc. are replaced by the special symbol "*" 19c, and the words are expressed as "*ABLE", "*ACITY", "ITAL", "ITOL", etc., respectively, as shown in FIGS. 5 and 6. As another example, common letters "SEN" of the words "SEND", "SENIOR", . . . "SENTIMENT", "SENTIMENTAL" are replaced by the same special symbol "*" 19c. Thus, the special symbol "*" is used to represent a combination of three common letters 19b.

The synonym-data memory location 24b of each data memory location stores a set of synonym data which represents a word which is synonymous with the word represented by the word-data stored in the corresponding word-data memory location 24a at the same address. For example, the synonym data stored in the synonym-data memory location 24b at address No. 225 represents a word "SWEETS" which is a synonym of a word "CANDY" represented by the word data "*DY" ("CANDY") stored in the data-memory location at the same address.

The flag-data memory location 24c of each data memory location stores flag data which indicates one end of a range of search of the data memory locations to find the word data representing the word which has been keyed in through the character keys 15. In this embodiment, a logical "1" is stored in each of the two flag-data memory locations at different addresses, in order to determine the first and last addresses between which the word-data memory locations are searched for the word data representing the keyed-in word.

The RAM 25 stores character data entered through the character keys 15, and word data and synonym data which have been retrieved from the ROM 24.

The operation of the electronic dictionary of the typewriter 11 with the above arrangement will be described referring to a flow chart of FIGS. 8 and 9 which show events of operations controlled by the CPU 23. For easy understanding, step numbers (numbers followed by letter S) to show the sequence of operation are given in FIGS. 8 and 9 and inserted in parenthesis in the following description.

After application of power to the typewriter 11, the CPU 23 is ready to accept input data which are entered through the keyboard 12, i.e., ready to accept character data which are entered through the character keys 15 (S1). If the operator desires to enter a word "CANDY", the character key 15 corresponding to letter "C" is first pressed. The CPU 23 transfers the character data "C" into the RAM 25 (S2), and directs the display 18 to indicate the character "C" based on the character data "C" stored in the RAM 25 (S3).

Then, the CPU 23 checks to see if the synonym-call key 16, any character key 15, space bar 14 or clear key 17 has been activated (S4–S7). When the operator depresses the character key 15 corresponding to letter "A" (S5), the CPU 23 goes to step S2 wherein the character data "A" is stored in the RAM 25. Successively, the character "A" is indicated to the right of the character "C" already indicated on the display 18 (S3). In the similar manner, the character keys corresponding to the remaining letters "N", "D" and "Y" of the word "CANDY" are operated, and the corresponding character data are stored in the RAM 25. As a result, the word "CANDY" is indicated on the display 18.

If it is desired to change a word already entered through the character keys 15, or to correct a misspelled (erroneously entered word), the clear key 17 is operated (S7). In this instance, the RAM 25 and the display 18 are cleared (S8), and the CPU 23 goes to step S1 and waits for entry of another or correct word.

When the operator wants to print a word, for example, "CANDY" already entered through the character keys 15, the space bar 14 is operated (S6). Upon activation of the space bar 14 which serves as a print-commanding key, the CPU 23 operates the printing device 21 according to the character data stored in the RAM 25, whereby the word "CANDY" is printed (S9). Subsequently, the CPU 23 clears the RAM 25 and the display 19 (S10), and goes back to step S1 for entry of another word.

When the operator presses the synonym-call key 16 to find a synonym of the word "CANDY" (S4), the CPU 23 initiates a searching operation in response to a signal from the synonym-call key 16, to find in the ROM 24 the word data which represents the word "CANDY" whose character data are stored in the RAM 25 (S11).

Figure 9:
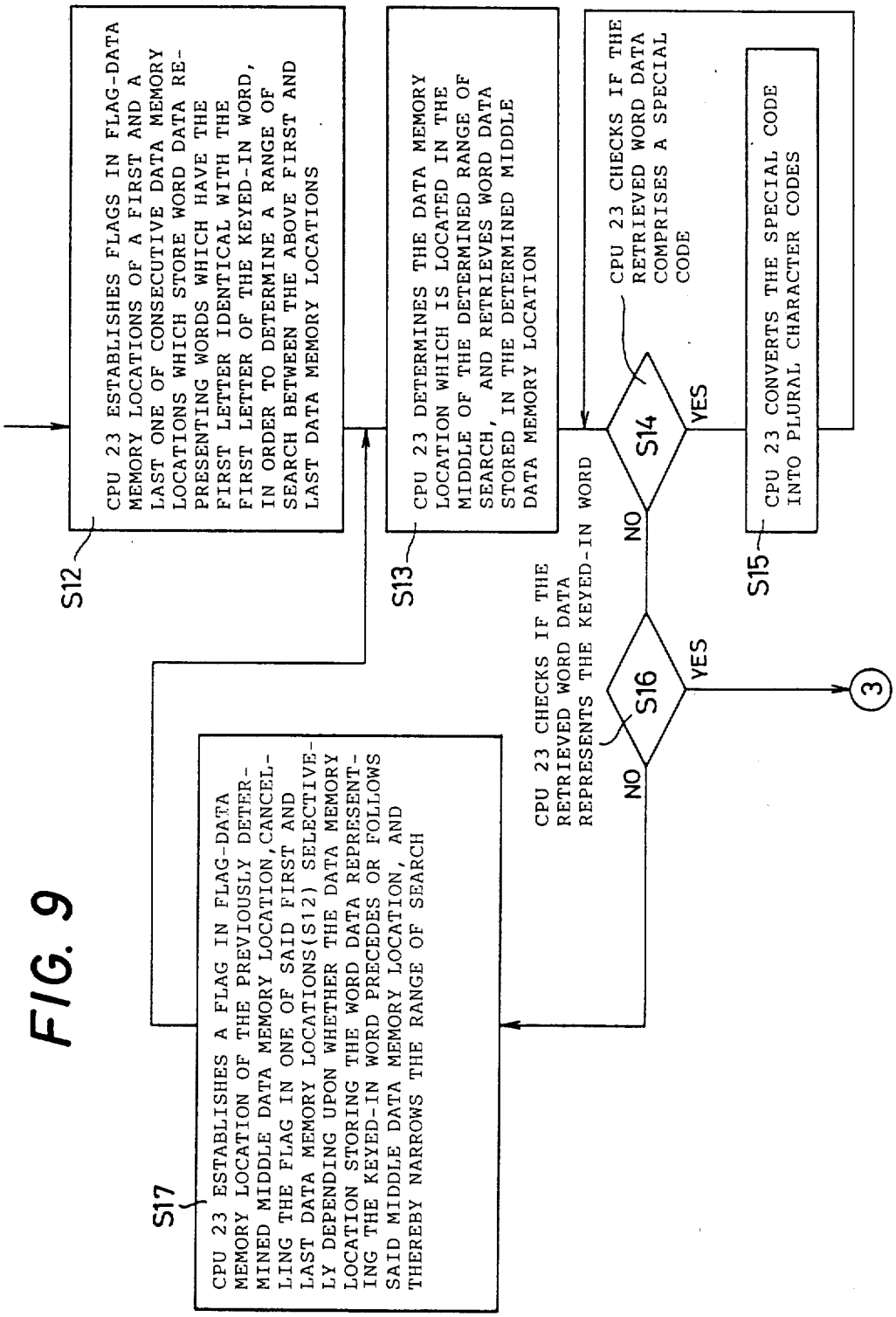

The searching operation is conducted as illustrated in FIG. 9. At first, the CPU 23 recognizes that the first letter of the five-letter word represented by the keyed-in character data "CANDY" is "C", and determines to search the group of consecutive data memory locations which store word data representing words which begin with the letter "C" which is the first letter of the keyed-in word "CANDY". This range of the search is set by establishing a logical "1" in each of the flag-data memory locations 24c of the first and last data memory locations of the above group, in this case, at address Nos. 200 and 300 as shown in FIG. 5 (S12). Then, the CPU 23 determines the data memory location which is located in the middle of the present search range, i.e., address No. 250, and stores this address number into the RAM 25. Subsequently, the CPU 23 retrieves the word data "*ITAL" at address No. 250, and stores the same in the RAM 25 (S13).

In the next step, the CPU 23 checks to see if the retrieved word data "*ITAL" comprises the special code which represents the special symbol "*" 19c (S14). If the special code is present in the retrieved word data as in this specific example, the CPU 23 scans the data memory locations in the backward direction to find the word data which does not include that special code. In this example, the CPU 23 finds the word data "CAP" at address No. 240, which does not include the special code (symbol "*" 19c), and thereby converts the special code into the corresponding character codes representing the letters "C", "A" and "P" (S15). After the conversion of the special code, the CPU 23 checks again if the word data contains another special code, or not (S14). In this example, the word data "CAPITAL" no longer contains a special code. However, the word "CAPITAL" at address No. 250 may use another special symbol "$" to represent the following two letters "I" and "T" which are commonly present in the preceding and/or following words, e.g., a word "CAPITOL" at address No. 254. In this case, the special symbol "$" is stored as another special code, and the CPU 23 converts, in step S15 (FIG. 9), this special code for the symbol "$" into plural character codes "I" and "T", after the special code for the symbol "*" has been converted into the corresponding charcter codes as described above. Thus, the CPU 23 is adapted to repeat steps S14 and S15 as long as the word data in question contains any special code.

The CPU 23 then checks to see if the retrieved word data "CAPITAL" is identical with the character data "CANDY" entered through the character keys 15 (S16). Since the retrieved data is not identical with the keyed-in character data, the CPU 23 goes to the next step (S17) to narrow the range of search in the following manner.

The CPU 23 judges whether the data memory loction which stores word data representing the keyed-in character data ("CANDY") is before or after the data memory location at address No. 250 in which the retrieved word data ("CAPITAL") is stored. In this example, the word data "CANDY" is stored before the word data "CAPITAL" in the alphabetical order. In this instance, the CPU 23 establishes a logical "1" in the flag-data memory at address No. 250, and cancels the already established logical "1" in the flag-data memory location at address No. 300, that is, establishes a logical "0" at address No. 300 (last address associated with the group of words beginning with "C"). In this condition, the logical "1" is established at address Nos. 250, and 200 (first address associated with the group). These addresses define opposite ends of a range of the second search. In the event that the data memory location which stores the word data corresponding to the keyed-in character data comes after the data memory location at address No. 250, the CPU 23 establishes a logical "1" at address No. 250, and cancels the already established logical "1" in the flag-data memory location at address No. 200 (establishes a logical "0" at address No. 200). In this condition, the logical "1" is established at address Nos. 250 and 300, and these addresses define a range of the second search.

Successively, the CPU 23 determines the data memory location which is located in the middle of the newly defined range of search, and retrieves the word data stored therein (S13). Then, the CPU 23 checks if the retrieved word data comprises the special code or not (S14). In this example, the data memory location at address No. 225 which is intermediate between address Nos. 200 and 250, stores the word data "*DY". Because of the presence of the special code in the word data "*DY", the CPU 23 scans the data memory locations before the address No. 225 to find the word data which does not use the special code (special symbol "*" 19c). As a result of this scanning, the CPU 23 finds the word data "CAN" at address No. 210, whereby the CPU 23 converts the special code into the character codes "C", "A" and "N", and recognizes that the word data "*DY" reads "CANDY" (S15). In the next step (S16), the CPU 23 checks if the retrieved word data "*DY", i.e., "CANDY" is identical with the keyed-in character data "CANDY".

As the retrieved word data is identical with the keyed-in word data "CANDY", the CPU 23 goes to the next step (S18; FIG. 8) wherein the CPU 23 retrieves synonym-data "SWEETS" which is stored in the synonym-data memory location 24b corresponding to the word-data memory location 24a storing the word data "CANDY" at address No. 225. The CPU 23 then stores the synonym data "SWEETS" in the RAM 25 (S19). Successively, the CPU 23 directs the display 18 to indicate a synonym word "SWEETS" 20 according to the synonym data "SWEETS" stored in the RAM 25 (S20) as shown in FIG. 2. That is, the synonym "SWEETS" 20 of the keyed-in word "CANDY" is displayed to the right of the keyed-in word "CANDY". Thus, the operator may know a synonym 20 of an English word 19 which has been keyed in through the character keys 15. With the synonym "SWEETS" displayed, the CPU 23 becomes ready to accept a signal from the space bar 14 or clear key 17 (S21, S22).

If the operator wishes to print the synonym "SWEETS" on the sheet of paper 22, the operator presses the space bar 14. Upon activation of the space bar 14, the CPU 23 activates the printing device 21 to effect a printing operation according to the synonym data "SWEETS" stored in the RAM 25 (S23). Then, the CPU 23 clears the RAM 25 and the display 18, and goes back to step S1, whereby the operator may continue a printing operation.

In the case where the operator wishes to enter a new word through the character keys 15, rather than print the synonym "SWEETS" of the keyed-in word "CANDY", the operator presses the clear key 17 (S25). In this instance, the CPU 23 clears the RAM 25 and the display 18, and goes back to step S1. Consequently, the operator may enter a desired new word for printing thereof or its synonym.

In the electronic dictionary which has been described hitherto, word data in a word-data memory location 24a comprises a special code (a code representing special symbol 19c) if at least two consecutive letters 19b (common letters) of a word 19 represented by the word data are identical with corresponding consecutive letters 19b of a word 19 represented by the word data which is to be stored in the immediately preceding or following word-data memory location 24a. The remaining letters 19a of the word 19 which are not identical to the corresponding letters 19a of the preceding or following word 19 are represented by ordinary character codes (representing letters), respectively. When the word data is retrieved, the special code, if contained in the word data in combination with a character code or codes, is converted into character codes. Consequently, the word data can be utilized in the same manner as used in the case where the word data consists of only character codes. The use of the special code in place of plural character codes to represent plural letters reduces the required memory capacity of the dictionary memory (ROM 24), particularly of its vocabularly storage section (24a), and makes it possible to store a relatively large number of entry words in the dictionary without increasing the storage capacity of its dictionary memory.

While the present invention has been described in its preferred embodiment, it is to be understood that the invention is not limited thereto, but may be otherwise embodied.

For example, the special code for the special symbol "$" may be used to represent the first two common letters 19b of consecutive words 19. Further, the special code may be used to represent four or more consecutive letters 19b which are commonly present in consecutive words. In this case, special symbols other than the asterisk "*" and "$" are used for those common letters. For instance, a symbol "#" may be used to represent a combination of four common letters 19b. These special symobls are stored in the form of special codes which are different from each other and different from the special codes representing the symbols "*" and "$" for three and two common letters.

Further, although the dictionary memory 24 stores synonym data in the related-data memory locations (synonym-data memory locations) 24b to permit indication and printing of synonyms of entry words of the dictionary, it is possible that the related-data memory locations 24b store other related-data which represent related information such as antonyms of the entry words, or equivalent Japanese words expressing the same or almost the same meaning of the entry words.

It is further possible that the CPU 23 be adapted to cause the display 18 to provide a message to indicate that no word data representing a keyed-in word is found in the ROM 24, in the event the CPU 23 fails to search for the word data which is identical with character data entered through the character keys 15. In this event, the CPU 23 should be adapted to go back to the first step of FIG. 8, possibly by activation of the clear key 17.

It will be obvious that other changes and modifications of the invention may occur to those skilled in the art without departing from the spirit and scope of the invention defined in the appended claims.

What is claimed is:

1. A typewriter, comprising:
   a dictionary memory having a multiplicity of data memory locations identified by respective addresses, each of said data memory locations including
     a word-data memory location which stores word data representative of a respective word of one language, and
     a related-data memory location for storing related data representing associated information associated with said word in the corresponding word-data memory location, said associated information being selected from a group consisting of a synonym, an antonym, and an equivalent word in another language, of the word in said corresponding word-data memory location,
   said word data in the word-data memory location at each one of said addresses comprising at least one character code each representing a letter of said word, or at least one of said character codes and at least one special code each representing a combination of at least two adjacent letters of said word which are identical with corresponding adjacent letters of a word represented by respective word data in the word-data memory location at an adjacent address which is adjacent to said each one of said addresses, said word data stored in said word-data memory locations being arranged in alphabetical order;
   a keyboard having a multiplicity of character keys operable to enter letters of a selected word of said one language, a call key, and a print-commanding key;

control means connected to said dictionary memory and said keyboard, and having retrieval means for retrieving upon operation of said call key said associated information associated with said entered word;

a working memory, connected to said keyboard and said retrieval means, for storing said entered word and the retrieved associated information;

display means operable under the control of said control means; and a printing device operable under the control of said control means;

said control means being responsive to said character keys for commanding said display means to indicate said entered word, responsive to said call key for commanding said display means to indicate said entered word, along with the respective associated information when said entered word is the same as a word represented by word-data in a respective word-data memory location, and responsive to said print-commanding key for commanding said printing device to print said entered word if said print-commanding key is operated when said display means displays no retrieved associated information responsive to said call key for the respective entered word displayed, and to print said retrieved associated information if said print-commanding key is operated when respective retrieved associated information is indicated on said display means along with the respective entered word responsive to the call key; and said retrieval means of said control means for retrieving said associated information being operable to search for said entered word by a process which includes defining a first range of said word-data memory locations for said searching for said entered word in said dictionary memory depending upon the first letter of said entered word, determining one of said word-data memory locations in said dictionary memory that is in the middle of said first range, and determining between which one of said word-data memory locations defining said first range and said middle worddata memory location said entered word would lie if stored in a respective one of said data memory locations, and defining a smaller range between the respective one of said word-data memory locations defining said first range and said middle word-data memory location, and repeating said determining of a middle word-data memory location for said smaller range and of between which one of the word-data memory locations defining the smaller range and the middle word-data memory location said entered word would lie if stored in said word-data memory, for successively smaller ranges in said word-data memory, until the entered word is located in said word data memory or it is determined that said entered word is not stored in said word-data memory.

2. A typewriter according to claim 1, wherein said print-commanding key is a space bar.

3. The typewriter of claim 1, wherein said word data representing words in said word-data memory comprise a plurality of character codes, each said character code representing a respective different plurality of letters of said language which are the same for respective letters of adjacent ones of said represented words, and when one of said character codes is in a respective position of said word-data for each said determining of a middle word-data memory location of a respective range, said character code is converted to the respective combination of adjacent letters for said determining of whether the entered word lies above or below said middle word-data memory location.

4. A typewriter, comprising:

a dictionary memory having a multiplicity of data memory locations identified by respective addresses, each of said data memory locations including a word-data memory location which stores word data representative of a respective word of one language, a related-data memory location for storing related data representing associated information associated with said word in the corresponding word-data memory location, said associated information being selected from a group consisting of a synonym, an antonym, and an equivalent word in another language, of the word in said corresponding word-data memory location, and a flag-data memory location which stores flag data indicative of one end of a range of search of said respective addresses in which a search is effected, said word data in the word-data memory location at each one of said addresses comprising at least one character code each representing a letter of said word, or at least one of said character codes and at least one special code each representing a combination of at least two adjacent letters of said word which are identical with corresponding adjacent letters of a word represented by respective word data in the word-data memory location at an adjacent address which is adjacent to said each one of said addresses;

a keyboard having a multiplicity of character keys operable to enter letters of a selected word of said one language, a call key, and print-commanding key;

control means connected to said dictionary memory and said keyboard, and including retrieval means for retrieving, upon operation of said call key, each said character code and each said special code of the word data stored in the respective word-data memory location, and further retrieving said associated information associated with said entered word when the entered word is the same as the word stored in said respective word-data memory location;

a working memory, connected to said keyboard and said retrieval means, for storing said entered word and the retrieved associated information;

display means operable under the control of said control means; and a printing device operable under the control of said control means;

said control means further including converting means for converting each retrieved special code into plural character codes which represent the respective combination of adjacent letters, an checking means for checking if the retrieved word data consisting of said at least one character code, and each of said plural character codes converted from each said special code, is identical with said character data of said entered word stored in said working memory;

said control means being responsive to said character keys to command said display means to indicate said entered word, responsive to said call key for commanding said display means to indicate said entered word, along with the respective associated information when said entered word is the same as a word represented by word-data in a respective word-data memory location, and responsive to said print-commanding key for commanding said printing device to print said entered word if said print-commanding key is operated when said display means displays no retrieved associated information responsive to said call key for the respective entered word displayed, and to print said retrieved associated information if said print-commanding key is operated when respective retrieved associated information is indicated on said display means along with the respective entered word responsive to the call key; and said control means further including means for effecting said search, in response to activation of said call key, to find any data memory location storing the word data representing said entered word, said means for effecting said search being operable for a (a) establishing a flag in said flag-data memory locations of a first and a last one of the consecutive data memory locations which store the word data representing the words which have the first letter identical with a first letter of said entered word, in order to set said range of search, (b) determining the data memory location which is located in the middle of said range of search, and retrieving the word data stored in the determined middle data memory location, (c) checking if the retrieved word data comprises said special code or not, (d) converting said special code, if contained in said retrieved word data, into said plural character codes, (e) checking if successive ones of the character code of the retrieved word data is identical with character data representing said entered word, and, if the retrieved word data is not identical with said character data, checking whether the data memory location which stores word data representing said entered word is before or after said middle data memory location, (f) establishing a flag in the flag-data memory location of said middle data memory location, (g) cancelling the flag established in the flag-data memory location of said last one of said consecutive data memory locations if the data memory location storing the word data representing said entered word precedes said middle data memory location, or cancelling the flag established in the flag-data memory location of said first one of said consecutive data memory locations if the data memory location storing the word data representing said entered word follows said middle data memory location, and (h) repeating the foregoing steps until the word data representing said entered word is retrieved.

5. A typewriter according to claim 4, wherein said word data is stored in the respective one of said word-data memory locations of the addressed data memory locations such that first letters of the individual words contained in the dictionary are arranged in a predetermined order of presentation of letters used in said language, second letters of the words being arranged in said predetermined order when said first letters of the adjacent words are identical, third and following letters if any of the words being arranged in said predetermined order when said second and following letters of said adjacent words are identical, said special code being used to represent plural consecutive letters of the word as counted from the first letter thereof when said plural consecutive letters are identical with corresponding letters of an adjacent word.

6. A typewriter according to claim 5, wherein a combination of said letters of a first one of said words, in a plurality of consecutive ones of said words each of which has said combination of letters, are represented by the character codes in place of said special code.

7. A typewriter according to claim 4, wherein said special code is changed depending upon the number of letters represented by the special code.

* * * * *